United States Patent
Miyamoto et al.

(10) Patent No.: US 7,088,557 B2
(45) Date of Patent: Aug. 8, 2006

(54) HEAD SUPPORTING DEVICE AND DISK DRIVE UNIT USING THE SAME

(75) Inventors: Makoto Miyamoto, Hyogo (JP); Hideki Kuwajima, Kyoto (JP); Kenichi Sakamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 567 days.

(21) Appl. No.: 10/205,003

(22) Filed: Jul. 25, 2002

(65) Prior Publication Data

US 2003/0043510 A1 Mar. 6, 2003

(30) Foreign Application Priority Data

Jul. 26, 2001 (JP) .................................. 2001-225910

(51) Int. Cl.
*G11B 21/08* (2006.01)

(52) U.S. Cl. .................................... 360/265.2

(58) Field of Classification Search ............... 360/265.2
See application file for complete search history.

(56) References Cited

U.S. PATENT DOCUMENTS

| 5,585,980 A | 12/1996 | Boutaghou |
| 6,137,658 A | 10/2000 | Matsuzaki et al. |
| 6,487,051 B1 | 11/2002 | Koyanagi et al. |

| 2001/0040769 A1 | 11/2001 | Takami |
| 2002/0126419 A1 | 9/2002 | Kuwajima et al. |

FOREIGN PATENT DOCUMENTS

| JP | 5-73987 | 3/1993 |
| JP | 5-159262 | 6/1993 |
| JP | 5-334823 | 12/1993 |
| JP | 6-84293 | 3/1994 |
| JP | 7-334955 | 12/1995 |
| JP | 9-82052 | 3/1997 |
| JP | 11-96699 | 4/1999 |
| JP | 2001-229634 | 8/2001 |
| JP | 2001-297548 | 10/2001 |
| JP | 2002-237160 | 8/2002 |

*Primary Examiner*—George Letscher
(74) *Attorney, Agent, or Firm*—McDermott Will & Emery LLP

(57) ABSTRACT

A head supporting device with a loading/unloading mechanism and a disk drive unit using the head supporting device. The head supporting device and a voice coil motor (VCM) make up a head actuator of the drive system. The head actuator has i) a support arm rotatable on a bearing, moving in directions along the radius of a recording medium and vertical to the surface of the medium; ii) a magnetically levitating head on a slider facing the medium; and iii) resilient member for applying force to the arm in a direction close to the medium. The VCM has a pair of yokes, a magnet, and a coil. When the head is lead to a head retracting position, the other end of the arm is pulled by the interaction of a magnetic member and the magnet at the resting position and adjacencies. This eases the load on the VCM, contributing to a compact and slim disk drive unit with toughness and rapid data-access.

29 Claims, 7 Drawing Sheets

HEAD SUPPORTING DEVICE AND DISK DRIVE UNIT USING THE SAME

FIELD OF THE INVENTION

The present invention relates to a head supporting device employing a magnetically levitated head, such as a magnetic head, optical head, and magneto-optic head, and a disk drive unit using the head supporting device. More particularly, it relates to the head supporting device equipped with loading/unloading mechanism (hereinafter referred to as L/UL mechanism) and a disk drive unit using the head supporting device.

BACKGROUND OF THE INVENTION

In recent years, portable electronic equipment, such as Personal Digital Assistance (PDA) and mobile phones, has been rapidly expanding its market, and getting smaller in size. At the same time, a magnetic disk drive unit, which has become commonly used as a handy storage device, has been required to have smaller and thinner body with increased toughness against shocks. Responding to the need for the unit with high-impact-resistance, various attempts have been made to offer improvements in a head supporting mechanism of a magnetic disk drive unit.

For example, employing a L/UL mechanism for a disk drive unit has been recognized as an effective way for providing an impact-resistant disk drive unit. Magnetic disk drive unit 129, as shown in FIG. 7, has a head supporting device equipped with L/UL mechanism. Support arm 102 has guide 102a at its tip; and has magnetic head-mounted slider 101 in the proximity of the tip. Driven by spindle motor 105, magnetic recording medium 112 starts rotating. During the rotating, slider 101 mounting a magnetic head (not shown) thereon levitates at a position over medium 112 for data writing or reading. This state is the loading mode in the U/L mechanism.

On the other hand, when medium 112 stops rotating, support arm 102 rotates on rotation axis 103c and moves toward the outside of medium 112. The movement of arm support 102 is controlled by voice coil motor (hereinafter referred to as VCM) 124, which operates on interaction between voice coil 116 disposed at support arm 102 and, magnet 120 and yokes (not shown) that sandwich voice coil 116 via a clearance. Ramp 118 having tapered portion 118a is formed at the outside of medium 112. Driven by VCM 124, support arm 102 withdraws from the surface to take guide 102a onto ramp 118. This "withdrawal" allows slider 101 to keep off medium 112—the magnetic head is in the unloading mode. The head supporting device shown in FIG. 7 employs locking mechanism 130 using a piece of iron and a magnet for supporting the arm.

In magnetic disk drive unit 129 having the head supporting device as described above, the magnetic head is kept away from medium 112 during the unloading mode. The structure prevents the head and a medium against shocks from outside. Compared to other systems, the L/UL system has decreased the chance of mechanically or magnetically damaging medium 112 by collision with the head.

However, it is also true that the L/UL mechanism-employed disk drive unit has a problem to be tackled: a rather large sliding load. When guide 102a runs onto tapered portion 118a of ramp 118, the load on the arm due to the "landing" surpasses the half of torque required for the VCM. In a multi-disk structure having a number of heads, the built-up load has been a serious problem. Besides, downsized magnetic disk imposes limitations on the VCM components including the coil, the yoke, and the magnet: the number of turns of the coil reduces due to the thinned coil; the magnetic circuit formed of thinned VCM components cannot capture sufficient fluxes. Such inconvenience inevitably reduces the torque of the VCM.

It has therefore been a significant challenge for manufacturers to reduce the load on the VCM. Addressing to the inconvenience, there have been many suggestions to decrease the load developed in the unloading motion of the arm. The followings are the examples: i) in Japanese Patent Publication No. JP7334955, a ball bearing is disposed on the surface of the guide where the tapered portion comes in contact so as to decrease the coefficient of friction of the tapered portion and the guide of the arm; ii) in Japanese Patent Publication No. JP1196699, a piece of iron and a locking magnet are added to a coil-holding member of the VCM. Magnetic interaction between the iron piece and the locking magnet provides the arm with a smooth turn, thereby reducing the load on the VCM. At the same time, the suggestion includes a guiding-and-locking system for a rotary actuator to protect components of the unit from an impact generated in the process of the unloading motion.

Still, the two suggestions shown above have problems to be solved: as for the former suggestion described in i), it needs an extremely high technique to dispose the ball bearing in the tiny space of the guide at the tip of the support arm in such downsized disk drive unit, thereby automatically decreasing productivity. Besides, mounting an additional part on the tip of the arm lowers the resonance frequency of the arm. When the arm is moved at a high speed, the lowered resonance frequency generates undesired various vibration modes, which requires the disk drive unit a time to get settled. The fact has been an obstacle to rapid data access. As for the latter one described in ii), disposing an extra locking system not only introduces a complication on downsizing the magnetic disk drive unit but also increases the cost.

Prior-art head supporting devices including the two examples above have similar structures: the support arm rotating on a spindle moves the slider substantially parallel to the surface of the recording medium; a resilient member including a spring is disposed between the spindle and the arm, or between the arm and a head-supporting member to apply force to the slider; the force works on the slider to levitate it with a fixed interval from the surface of the medium. In the prior-art, it has never been discussed the possibility that a vertical movement of the arm with respect to the medium surface can reduce the load on the VCM. Manufacturers have not reached subtle solutions to the reduction of the load on the VCM.

SUMMARY OF THE INVENTION

It is therefore the object of the present invention to provide a head supporting device equipped with L/UL mechanism capable of providing i) a simple structure; ii) higher impact resistance; iii) rapid data access, with the load on the VCM minimized. At the same time, it is the object of the invention to provide a disk drive unit using the head supporting device.

To address the problem above, the head supporting device of the present invention has i) a support arm and ii) a head mounted on a slider at one end of the support arm. The head is disposed on the surface facing to a recording medium. The arm rotates on a bearing not only to move in a direction along the radius of the medium but also move in the direction vertical to the medium. In addition, resilient means is employed for applying force to the head-mounted end of the arm in a direction closer to the medium.

The present invention has various aspects as follows:

a) employing a magnetically attracting member for pulling the other end of the arm in order to reduce the force applied to the arm;

b) disposing a gimbal mechanism on the arm to hold the slider movable in the roll-and-pitch direction;

c) employing materials possessing high stiffness for the arm;

d) disposing a plate spring as resilient means between the bearing and the arm in the direction along the rotation axis;

e) disposing a pivot bearing having a pair of tops so that the arm can rotate, with the help of the tops as supporting points, in the direction vertical to the recording medium;

f) locating the tops of the pivot bearing so as to be vertical to the axial direction of the bearing and to the lengthwise direction of the arm, and so as to have contact with the arm on a line through the center of rotation in a direction along the radius of the medium;

g) disposing each top of the pivot bearing so as to be symmetrical with respect to the center line of the arm in the lengthwise direction;

h) disposing the pivot bearing so that each top of the bearing makes a point-contact with the arm, or makes a line-contact in which the line is parallel to the surface of the arm and is vertical to the arm in its lengthwise direction;

i) locating the center of gravity of the portion held by the resilient means at a point of intersection of the two rotation axes of the arm, one of which extends in the direction along the radius of the medium, and the other extends in the direction vertical to the recording surface of the medium.

As described above, the arm holder made of material having high stiffness not only can be resistant against shocks from the outside, but also offers the resilient force to be applied to the slider with a degree of flexibility. This allows the structure to have higher impact-resistant and higher resonance frequency, realizing a head supporting device with a quick-response and a rapid data access.

The disk drive unit of the present invention contains:

a) a rotatably fixed recording medium;

b) a head supporting device further includes i) a support arm; and ii) a head mounted on a slider at one end of the support arm, iii) resilient means for applying a force to the arm in the direction close to a recording medium, and the arm rotates on a bearing not only to move in a direction along the radius of the medium but also move in the direction vertical to the medium;

c) a pair of yokes having a clearance therebetween disposed in the direction parallel to the rotating axis of the recording medium, which locates on the side opposite to the slider with respect to the rotation axis of the arm;

d) a magnet disposed in the clearance between the yokes;

e) a coil held by the arm, which is located in the clearance formed between the magnet and the yokes;

f) a rotator for rotating the recording medium;

g) a control circuit electrically connected with the head, the rotator, and the coil, controlling the rotation of the medium and the movement of the arm; and h) a head retracting mechanism for supporting the head at a predetermined resting position to keep off the head from the medium.

When the head is lead to the resting position, an attracting member disposed at the resting position and in proximity to the position magnetically pulls the other end of the arm, thereby reducing the resilient force applied to the arm in a direction closer to the medium.

With the structure described above, the arm can be formed as a combination of rigidity and resiliency—the rigidity not only protects the arm from physical shocks from outside, on the other hand, the resiliency allows the force applied by the resilient means to be determined with a degree of flexibility, providing the disk drive unit with quick response and rapid data access.

Furthermore, to tackle with forgoing problems, the disk drive unit of the present invention has several aspects as follows:

a) interaction between the magnet and a magnetic member integrally held by the coil drives the magnetically attracting mechanism. The magnetic member is disposed at a position on a circle having a radius greater than the radius of outer circumference of the magnet. The magnetic attracting mechanism magnetically pulls the other end of the arm to reduce the resilient force generated in the sliding motion of the guide of the arm and the ramp in the unloading mode. This movement eases the load on the VCM without interrupting the seek operation. With the structure, the disk drive unit of the present invention has a simple structure and high impact-resistance in its compact and slim body, providing rapid data access.

b) The disk drive unit has a magnet whose outer perimeter is overhung at a position corresponding to the head retracting position or in the proximity of the position. With such shaped magnet, the coil can capture greater amount of fluxes therein, thereby providing the VCM with higher torque.

c) The disk drive unit has a head retracting mechanism formed of a ramp disposed in a position at the outer or inner perimeter of the recording medium. The ramp can keep the head away from the medium during the unloading mode, protecting the head against damage by shocks from outside. The fact contributes to provide a higher impact-resistant disk drive unit.

d) The disk drive unit has a ramp made of materials with smooth texture, i.e., with lower coefficient of friction, such as Liquid Crystal Polymer (LCP) resin, Poly Phenylene Sulfide (PPS) resin, and Poly Oxy Methylene (POM) resin. Employing such material reduces resistance between the guide and the taper of the ramp in the unloading mode, thereby easing the load on the VCM.

e) The disk drive unit has a gimbal mechanism on the support arm. The mechanism holds the slider movable in the roll-and-pitch direction. The mechanism accommodates undesired slant of the slider in the roll-and-pitch direction with respect to the medium in the loading mode.

f) The disk drive unit has a support arm made of materials having high stiffness. The stiffness not only protects the arm against shocks, but also provides the arm with higher resonance frequency, allowing the disk drive unit to have higher access speed.

g) The disk drive unit has resilient means formed of plate spring disposed between the bearing and the arm in the axial direction of rotation. Disposing the plate spring provides the with rigidity and resiliency, whereby the resilient force to the slider can be determined with a degree of flexibility. As an additional plus, the structure realizes the disk drive unit having a low-profile head supporting device in the direction vertical to the recording medium.

h) The disk drive unit has a pivot bearing with a pair of tops that makes contact with the arm. The arm rotates, with the help of the tops of the pivot bearing as supporting points, in the direction vertical to the recording medium. The structure properly determines the center of rotation, whereby the head can be positioned with higher accuracy.

i) In the disk drive unit having a pivot bearing with a pair of tops, the tops of the bearing are located so as to be vertical to the axial direction of the bearing and to the lengthwise direction of the arm, and so as to have contact with the arm on the line through the center of rotation in a direction along the radius of the medium;

j) In the disk drive unit having a pivot bearing with a pair of tops, each top of the bearing is disposed in a symmetrical arrangement with respect to the centerline of the arm in its lengthwise direction. Such designed structure keeps the weight of the arm in balance in its widthwise direction, providing a disk drive unit equipped with high-impact-resistant head supporting device.

k) In the disk drive unit having a pivot bearing with a pair of tops, each top of the bearing makes a point-contact with the arm, or makes a line-contact in which the line is parallel to the surface of the arm and is vertical to the arm in its lengthwise direction. Such designed structure reduces the torque of the VCM to move the arm in the direction vertical to the medium, easing the load on the VCM.

l) The disk drive unit contains at least a bearing unit; a pivot bearing; resilient means; a support arm; and a coil holder having a coil. Together with a ring-shaped collar disposed under the coil holder, the components make up the head actuator arranged around the center of rotation of the arm. With such simple structure, the head actuator can offer movements in a direction along the radius of the recording medium and in the direction vertical to the surface of the medium. Also, the structure protects the head and the medium from undesired collision by shocks from outside, providing the disk drive unit with quick response and rapid data-access.

m) In the disk drive unit, the center of gravity of the portion held by the resilient means is located at a point of intersection of the two rotation axes of the arm, one of which extends in a direction along the radius of the medium, and the other extends in the direction vertical to the recording surface of the medium. Such designed structure minimizes undesired vibrations of the arm that can be caused by accidental shocks from outside.

n) The disk drive unit has a magnetic member in the shape of small cylinder, small ellipsoid, or small ball. Such designed structure reduces the load on the guide of the arm and the ramp in the unloading mode, thereby reducing the load on the VCM. This contributes to provide a compact and slim disk drive unit with a simple structure.

DESCRIPTION OF THE PREFERRED EMBODIMENTS

The preferred embodiments of the present invention are described hereinafter with reference to the accompanying drawings.

First Preferred Embodiment

Figure 1:
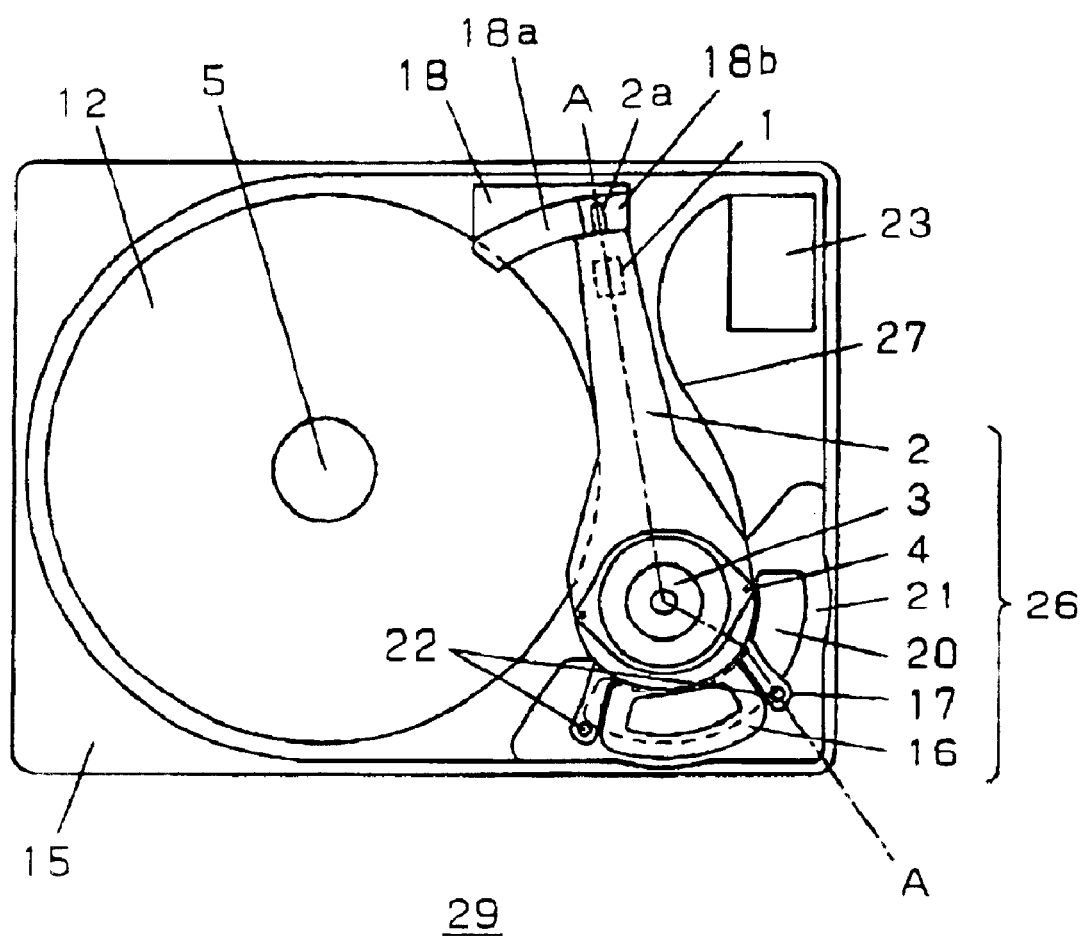
FIG. 1 is a plan view illustrating the structure of a head supporting device and a disk drive unit using the same in accordance with a first preferred embodiment of the present invention.

FIG. 1 is a plan view illustrating the structure of a head supporting device and a disk drive unit using the same in accordance with a first preferred embodiment of the present invention. FIG. 1 shows the state in which support arm 2 rests on ramp 18, that is, shows the magnetic head in the unloading mode. FIG. 1 bears some components in common with those in the structure of the prior-art in FIG. 7.

A head element (not shown) responsible for reading and writing data is mounted on slider 1. Slider 1 having the head element is fixed on the surface of support arm 2 so that the head element faces the recording medium 12. First bearing unit 3 and second bearing unit 4, which will be described in detail later, control the movement of support arm 2. First bearing unit 3 allows arm 2 to swivel back and forth across the surface of medium 12, while second bearing unit 4 allows support arm 2 to "swing" up and down with respect to the surface of medium 12.

Spindle motor 5 journals recording medium 12. In the magnetic head is ready for operation—in the loading mode, the head levitates over medium 12 for writing or reading data. The levitation of the head is offered by the interaction of airflow developed by the rotation of medium 12 and the force given by head supporting device 9 so as to urge slider 1 toward medium 12.

Head actuator 26 includes support arm 2; first bearing unit 3; second bearing unit 4; coil 16; coil holder 17; upper yoke 19 (not shown in FIG. 1); magnet 20; and lower yoke 21.

Figure 7:
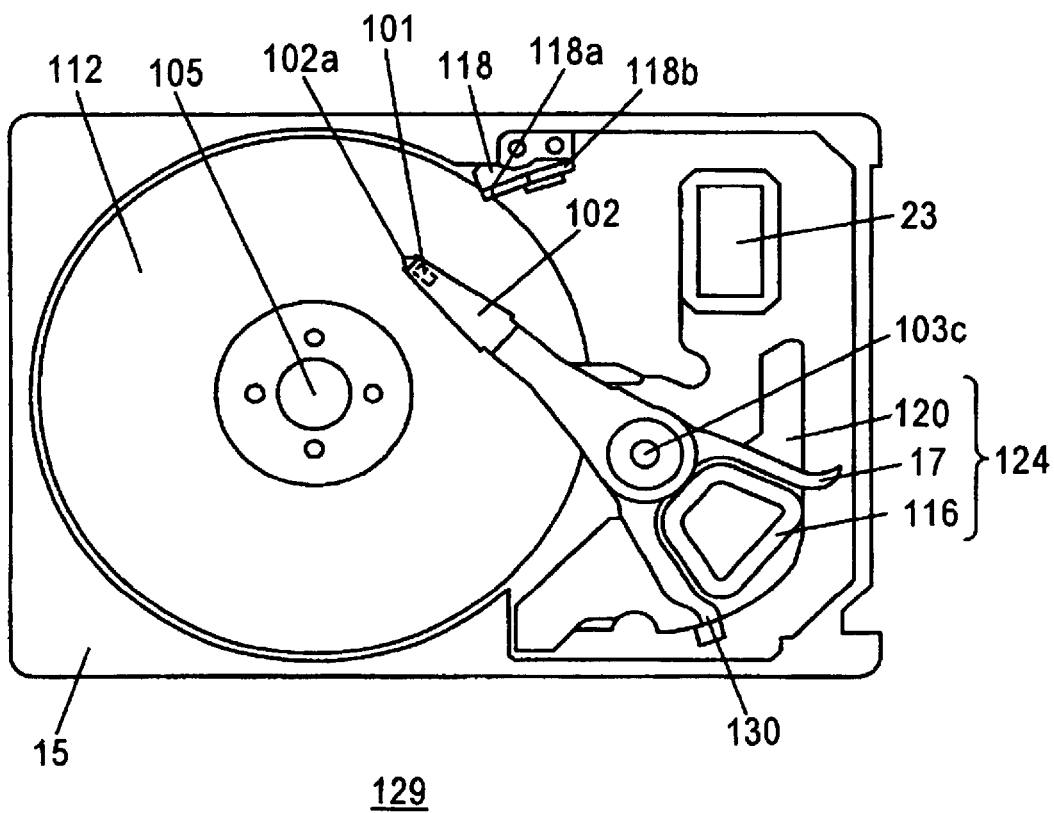
FIG. 7 is a plan view illustrating the structure of a prior-art disk drive unit.

When medium 12 stops its rotation, guide 2a formed at the tip of support arm 2 withdraws from the surface of medium 12 to ramp 18. Having tapered portion 18a and holder 18b, ramp 18 accepts guide 2a to rest it thereon. The "withdrawal" protects slider 1 and medium 12 from collision by shocks. Housing 15 has control circuit 23 therein (as also shown in FIG. 7). Circuit 23 is connected to actuator 26 via flexible wiring board 27 to provide head actuator 26 with signal-processing control. Circuit 23 may be disposed outside of housing 15. Housing 15 maintains the proper relation between these components. Besides, housing 15 serves as a protector, fitted with a similarly shaped lid (not shown), blocking out an adversely effect caused by dust debris or changes in airflow.

Figure 2:
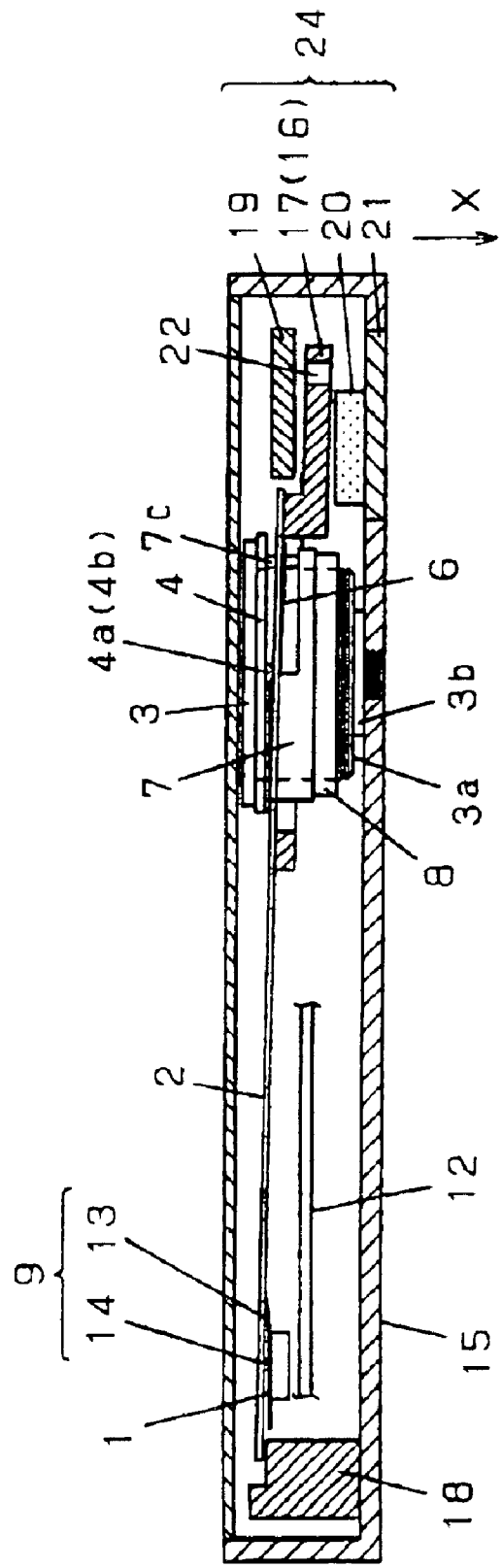
FIG. 2 is a sectional view illustrating the structure of the head supporting device and the disk drive unit using the same in accordance with the first preferred embodiment.

FIG. 2 is a sectional view taken along the line A—A in FIG. 1. Like FIG. 1, FIG. 2 shows the unloading mode in which support arm 2 rests on ramp 18. The bearing unit and its proximity are not shown as a sectional view but as a side view in the figure.

First bearing unit 3 has a ball bearing (not shown) therein. Outer portion 3a is rotatable, whereas inner portion 3b is screwed down to housing 15. Lower yoke 21 on which magnet 20 mounted is fixed to housing 15, while upper yoke 19 is disposed so as to keep a clearance with magnet 20. In the clearance between the two yokes, coil holder 17 accommodating coil 16 is disposed. In this way, a magnetic circuit is formed of the components above. Coil holder 17 is fixed to support arm 2. Coil 16 (not shown in FIG. 2), magnet 20, upper yoke 19, and lower yoke 21 make up VCM 24. VCM 24 rotates support arm 2 on first bearing unit 3, so that support arm 2 has radially-outward and inward movement.

Coil holder 17 has magnetic member 22. In FIG. 1, two magnetic members are disposed each on tabs of coil holder 17 in FIG. 1. Magnetic member 22 sits on a position radially beyond the outer arc of magnet 20 so as not to interrupt VCM 24 in a seek operation.

In head supporting device 9 of FIG. 2, gimbal 13 employing a gimbal spring is disposed on slider 1. Gimbal 13 allows slider 1 to move, through dimple 14, in the roll-and-pitch direction. Gimbal 13 can thus control slider 1 to have the proper position with respect to recording medium 12 by accommodating undesired tilt in the roll-and-pitch direction.

Figure 3:
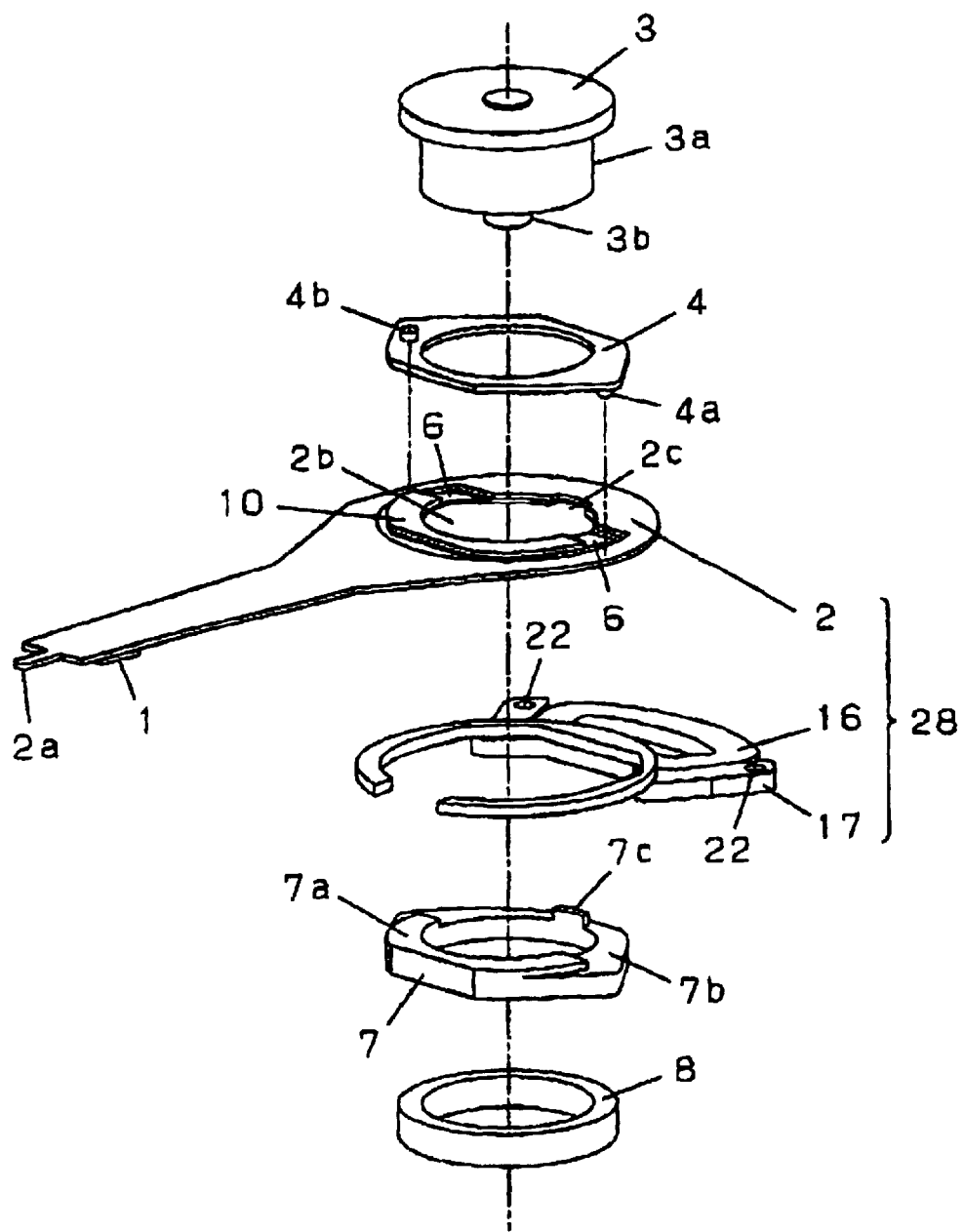
FIG. 3 is an exploded perspective view illustrating the head actuator section having the head supporting device in accordance with the first preferred embodiment.

FIG. 3 is an exploded perspective view illustrating the structure of first bearing unit 3 and second bearing unit 4. The explanation will be given with reference to the figure and FIG. 2. Force applying means exerts force on slider 1 in the direction toward medium 12. The first preferred embodiment employs as the force-applying resilient means a ring-shaped plate-spring 6, which is made of stainless or phosphor bronze. Half-ring shaped fixing member 10 holds the "half ring" of resilient member 6. The other half of member 6 lies under support arm 2 on the side of the coil. Fixing member 10 and the "half ring" of resilient member 6 fixed thereto are located within opening 2b of support arm 2 so as not to interrupt up-and-down movements of support arm 2.

Support arm 2 and coil holder 17 with coil 16 make up head-supporting assembly 28. Head-supporting assembly 28 with second bearing unit 4 and collar 7 as shown in FIG. 3 completes head actuator 26. Head actuator 26 is tightened by nut 8 at the bottom and, inner portion 3b of first bearing unit 3 is fixed to housing 15.

In collar 7, half-ring portion 7a—the half on the side of slider 1—is formed thicker than the opposite half-ring portion 7b. Portion 7a is set in opening 2b of support arm 2 to hold resilient member 6 and fixing member 10 against second bearing unit 4. On the other hand, projection 7c of collar 7 is fitted into pit 2c formed at opening 2b of support arm 2 to reach second bearing unit 4. In this way, fixing member 10 and a part of resilient member 6 attached thereto are securely held by first bearing unit 3; second bearing unit 4; half-ring portion 7a and projection 7c of collar 7; and nut 8.

In first bearing unit 3, a bearing (not shown) disposed between outer portion 3a and inner portion 3b allows outer portion 3a to be rotatable. Second bearing unit 4 has a pair of pivots 4a and 4b that serve as supporting points for movements of support arm 2 in a direction vertical to the surface of medium 12.

Figure 4:
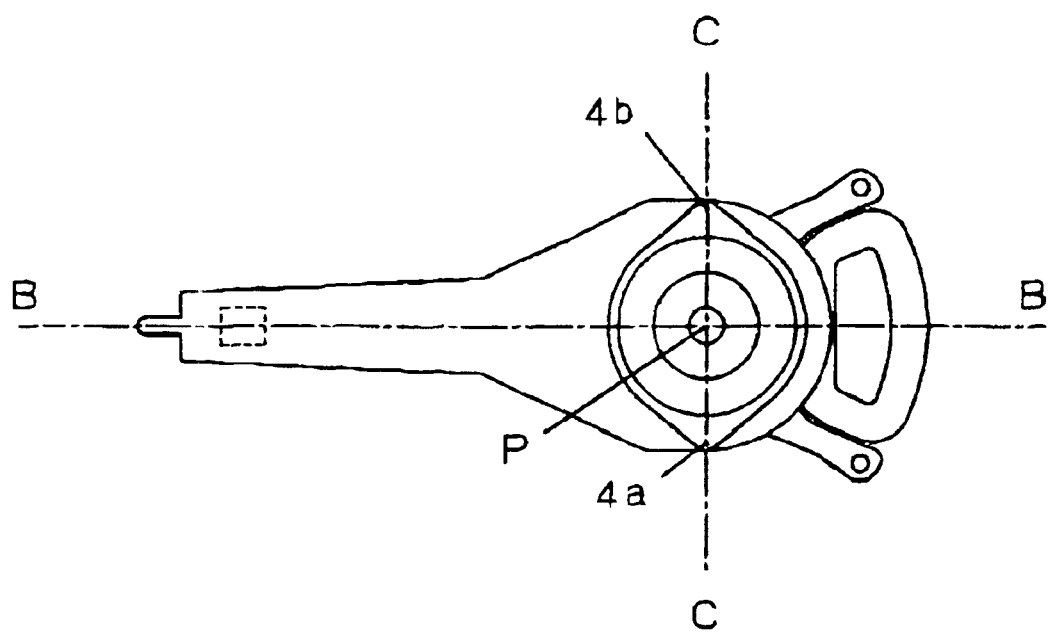
FIG. 4 is a plan view illustrating the head actuator section having the head supporting device in accordance with the first preferred embodiment.

Pivots 4a and 4b of second bearing unit 4 should be positioned as shown in FIG. 4: they should be symmetric about the center line of support arm 2 in its lengthwise direction (indicated by the line B—B in FIG. 4); and also should be on the line perpendicular to line B—B (indicated by the line C—C). Although the embodiment employs a pair of pivots, it is not limited thereto: a wedge-shaped portion, with which a line-contact is obtained under the positional relation stated above, can offer the same effect.

Such designed structure allows support arm 2 and other components forming the head supporting device to be made of materials with high stiffness. Employing such rigid material not only protects support arm 2 from damage by shocks, but also provides support arm 2 with higher resonance frequency. Therefore, support arm 2 can be free from undesired vibration modes for which the prior-art has suffered, and therefore can be free from settling operation. This advantageous fact provides the arm with high-speed rotation and positioning, increasing the access speed of magnetic disk drive unit 29.

In addition, resilient member 6 is separately formed from support arm 2. Therefore, the strength and a spring coefficient of the plate spring are desirably determined by changing the material or thickness of the plate spring.

The center of gravity of the portion held by resilient member 6, that is, in the case of employing VCM 24 to drive support arm2, the center of gravity of support arm 2 having coil holder 17 with coil 16 should be positioned on the point of intersection of rotation axis in a direction along the radius of medium 12 and rotation axis in the direction vertical to medium 12. In other words, the center of gravity of support arm 2 has the position substantially the same as the middle point of the line connected between the pivots 4a and 4b (indicated by point P in FIG. 4). The positioning improves the stability of the head supporting device, eliminating undesired vibrations. In the structure, a slightly off-centered centroid position will be negligible on practical use.

The disk drive unit structured above goes into the loading mode through the steps below: i) rotation of medium 12 driven by spindle motor 5 generates airflow on the surface of medium 12; ii) movement of support arm 2 driven by VCM 24 takes slider 1 from ramp 18 to levitate over a position of a track of medium 12; iii) with slider 1 been levitated, data writing or reading is performed by a head element (not shown) mounted on slider 1.

Now will be described how the magnetic head goes into the unloading mode in the disk drive unit of the present invention.

Ramp 18 is disposed outside of medium 12 as shown in FIGS. 1 and 2. During the unloading mode, the magnetic head retracts on ramp 18. Ramp 18 is made of materials having smooth texture, such as Liquid Crystal Polymer (LCP) resin, Poly Phenylene Sulfide (PPS) resin, and Ply Oxy Methylene (POM) resin.

When medium 12 stops its rotating, i.e., on the process to the unloading mode, support arm 2 having slider 1 moves toward outside of medium 12 and guide 2a disposed at the tip of support arm 2 slides on tapered portion 18a of ramp 18, then finally settles on pit 18b. When guide 12a runs on tapered portion 18a of ramp 18, head-supporting assembly 28 tilts, with the help of pivots 4a and 4b serving as supporting points, with respect to the surface of medium 12. At this moment, the other end of support arm 2 (on the coil-disposed side) moves down, that is, magnetic member 22 comes close to magnet 20. Magnetic member 22 is attracted by magnet 20 in the direction indicated by the arrow "X" in FIG. 2, whereby the tip having guide 2a further lift up from medium 12.

This lift-up is effective in minimizing friction between guide 2a and tapered portion 18a of ramp 18. That is, guide 2a can slide on tapered portion 18a without undue stress. The load caused by contacting guide 2a with ramp 18 can be thus reduced. By virtue of the reduced load, VCM24 can start itself with smaller torque. This fact contributes to compact and slim disk drive unit 29 equipped with downsized but still powerful VCM24.

Although the embodiment introduces the structure employing two magnetic members 22 each disposed in different position, it is not limited to: the structure having a single magnetic member with an effectual positioning may offer the same effect.

Although the embodiment introduces the structure in which magnetic member 22 is disposed on a position radially beyond the outer arc of magnet 20, it is not limited thereto: other positions are possible as long as the position faces to magnet 20 and has no ill effect on levitation of slider 1.

Although the embodiment introduces the structure employing magnetic member 22 given the shape of small cylinder, it is not limited thereto: the magnetic member may also have the shape of small ellipsoid or small ball.

It will be understood that the present invention poses no limitations to the placement, the number, the shape of magnetic member 22.

According to the head supporting device and the disk drive unit using the same of the embodiment, as described above, separately structured two sections—the first and second bearing units—control the movement of the arm. This contributes to flexible design principles, providing a compact and slim structure with stiffness and rapid data-access.

Second Preferred Embodiment

Figure 5:
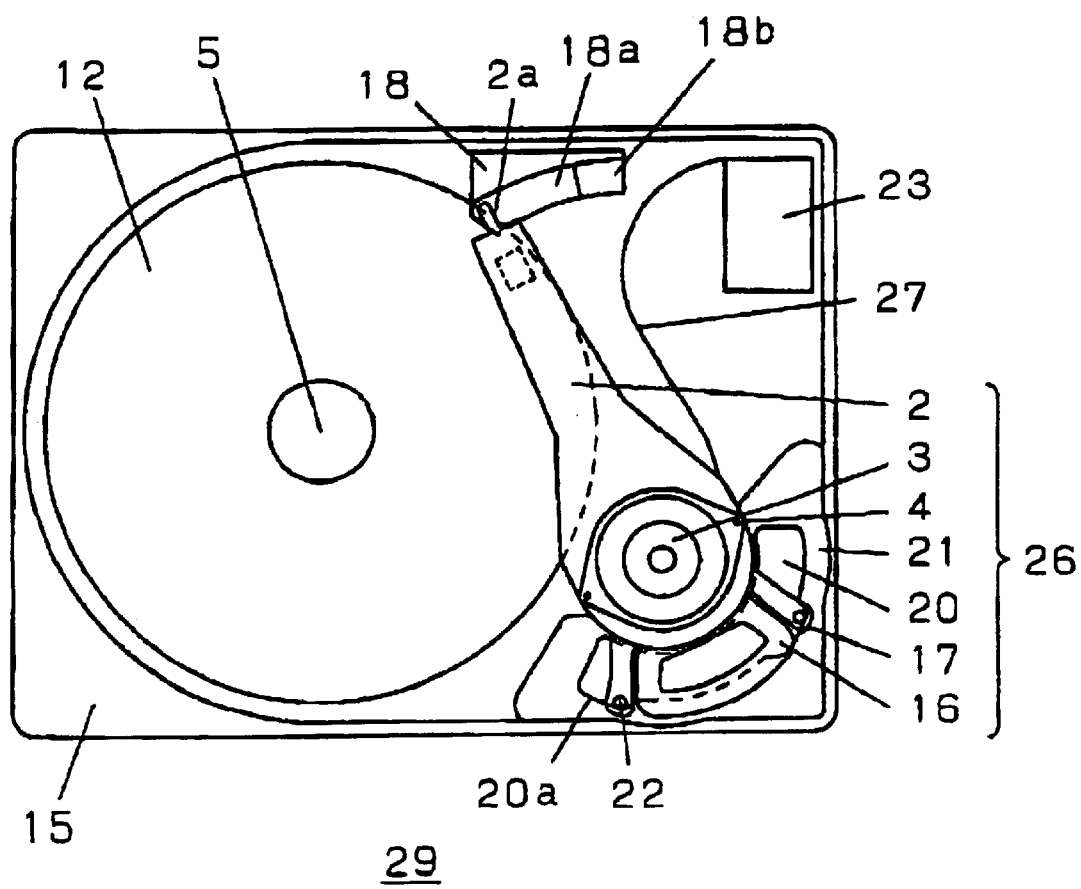
FIG. 5 is a plan view illustrating the structure of a disk drive unit in accordance with a second preferred embodiment.
Figure 6:
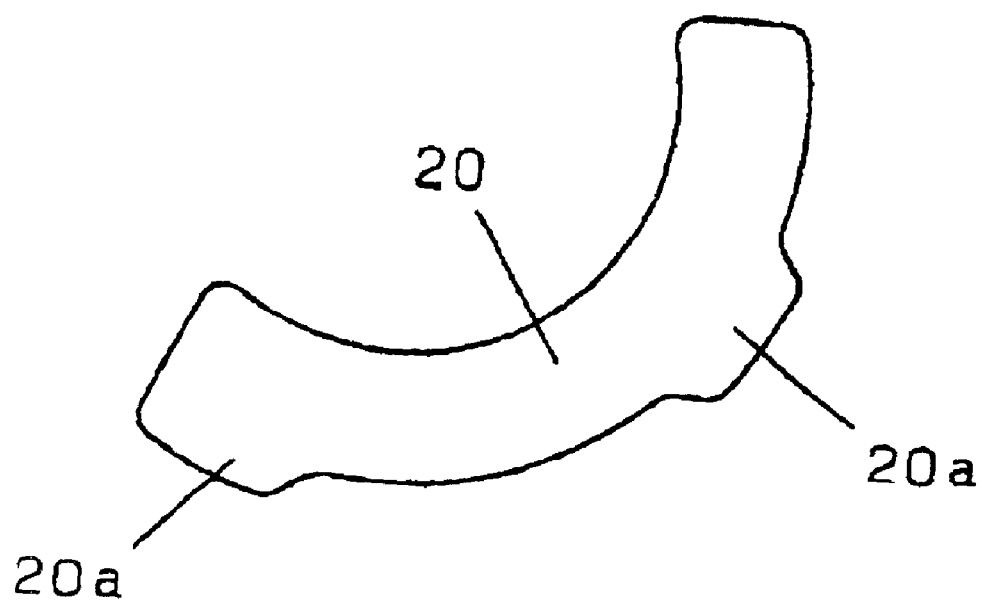
FIG. 6 is a plan view illustrating the shape of a magnet in accordance with the second preferred embodiment.

FIG. 5 is a plan view illustrating the structure of a disk drive unit in accordance with the second preferred embodiment. The figure shows the state in which arm 2 approaches tapered portion 18a of ramp 18—just before the unloading mode. FIG. 6 is a plan view showing magnet 20 as a component of VCM24 of head actuator 26. The disk drive unit of the embodiment differs in the shape of magnet 22 from that of the first preferred embodiment: magnet 20 has overhang portions 20a on the outer arc at a position corresponding to the unloading position.

Employing such shaped magnet increases the forces of attraction, ensuring the lift-up movement of guide 2a of arm 2 away from the surface of medium 12. The friction between guide 2a and tapered portion 18a, i.e., the load on both components is further reduced. With the structure, guide 2a can run on tapered portion 18a without undue stress.

Generally, an edge of a magnet has low density of magnetic flux. Considering the fact, VCM24 cannot have a sufficient torque at a position corresponding to the edges of the magnet. According to the embodiment, however, disposing overhang portions 20a maintains the magnetic flux sufficient for coil 16, allowing VCM24 to operate with stabilized torque in the unloading position. This improvement can realize a smaller and thinner VCM24, allowing the whole structure of a disk drive unit to have a compact and slim body.

Although the embodiment employs the magnet having overhang portions on the outer arc, it is not limited thereto: other shaped magnets may be acceptable as long as the VCM can obtain the magnetic flux enough for smooth operation.

Although the two embodiments introduce the structure in which ramp 18 is disposed at the outside of medium 12, it is not limited thereto: the structure having ramp 18 disposed on the side of the inner perimeter of the medium can offer the similar effect.

It will be understood that the present invention is applicable with the same advantages to disk systems in which the head has no contact with the medium during the disk halting, such as an optical disk drive unit and a magneto-optic disk drive unit.

According to the present invention, as described above, it becomes possible to provide a highly improved disk drive unit equipped with a head supporting device having high-impact-resistance and rapid data-access. The structure of the invention allows the support arm to swing up and down, thereby reducing the load on the VCM when the arm comes in contact with the ramp. The structure having the ramp offers another advantage: the magnetic head can rest on the ramp, being kept off the recording medium, during the unloading mode. The structure therefore decreases the chance of collision that can damage the medium and the head.

Furthermore, the structure of the present invention reduces the load developed by contacting the guide of the arm with the ramp, thereby minimizing the load on the VCM. It is thus possible to provide a compact and slim disk drive unit with high-impact-resistance and rapid data-access capability.

What is claimed is:

1. A head supporting device comprising:
   a) a support arm rotatable on a bearing unit, moving in a direction along a radius of a recording medium and in a direction vertical to a surface of the recording medium;
   b) a head mounted on a slider disposed at one end of the support arm, said head facing the surface of the recording medium; and
   c) resilient means for applying force to the support arm in a direction toward the recording medium,
   wherein a magnetically attracting member for attracting an end opposite to the head mounted end of the support arm is utilized to reduce the force applied to the support arm.

2. The head supporting device as defined in claim 1, wherein the support arm has a gimbal mechanism for holding the slider movable in a roll-and-pitch direction.

3. The head supporting device as defined in claim 1, wherein the support arm is made of materials with stiffness.

4. The head supporting device as defined in claim 1, wherein a plate spring as the resilient means is disposed between the bearing unit and the support arm in an axial direction of rotation.

5. The head supporting device as defined in claim 1, wherein a pivot bearing having a pair of pivots is disposed on the bearing unit so that the pivots make contact with the support arm, whereby the support arm can move in a direction vertical to the surface of the recording medium.

6. The head supporting device as defined in claim 5, wherein the pivots of the pivot bearing are located so as to be vertical to an axial direction of the pivot bearing and to a lengthwise direction of the support arm, and so as to have contact with the support arm on a line through a center of rotation in a direction along the radius of the recording medium.

7. The head supporting device as defined in claim 6, wherein each pivot of the pivot bearing is symmetrically located about a lengthwise center line of the support arm.

8. The head supporting device as defined in claim 6, wherein each pivot of the pivot bearing and the support arm have a point-contact, or a line-contact in which the line is parallel to a surface of the support arm and is vertical to the support arm in its lengthwise direction.

9. The head supporting device as defined in claim 5, wherein each pivot of the pivot bearing is symmetrically located about a lengthwise center line of the support arm.

10. The head supporting device as defined in claim 5, wherein each pivot of the pivot bearing and the support arm have a point-contact, or a line-contact in which the line is parallel to a surface of the support arm and is vertical to the support arm in its lengthwise direction.

11. The head supporting device as defined in claim 1, wherein a center of gravity of a portion held by the resilient means is located at a point of intersection of i) a rotation axis in a direction along the radius of the recording medium; and ii) a rotation axis in direction vertical to the surface of the recording medium.

12. A disk drive unit comprising:
   a) a rotatably fixed recording medium;
   b) a head supporting device further including:
      b-1) a support arm rotatable on a bearing unit, moving in a direction along a radius of the recording medium and in a direction vertical to a surface of the recording medium;
      b-2) a head mounted on a slider disposed at one end of the support arm, said head facing the surface of the recording medium; and
      b-3) resilient means for applying force to the support arm in a direction close to the surface of the recording medium;
   c) a pair of yokes having a clearance therebetween disposed at an end opposite to the head-mounted end of the support arm in a direction parallel to a rotating axis of the surface of the recording medium;
   d) a magnet held by the support arm, which is disposed in the clearance between the yokes;
   e) a coil held by the support arm, which is located in the clearance formed by the magnet and the yokes;
   f) a rotator for rotating the recording medium;
   g) a control circuit electrically connected with the head, the rotator, and the coil, controlling rotation of the recording medium and movement of the support arm; and
   h) a head retracting mechanism for supporting the head at a predetermined resting position to keep off the head from the recording medium,
   wherein an magnetically attracting mechanism disposed at the resting position and in proximity to the resting position magnetically pulls the end opposite to the head-mounted end of the support arm when the head is in withdrawal motion, thereby reducing the force applied by the resilient means.

13. The disk drive unit as defined in claim 12, wherein the magnetically attracting mechanism is actuated by an interaction between the magnet and a magnetic member integrally held by the coil.

14. The disk drive unit as defined in claim 12, wherein a magnetic member integrally held the coil is disposed on a position radially beyond an outer arc of the magnet.

15. The disk drive unit as defined in claim 13 or claim 14, wherein the outer arc of the magnet is partly overhung at a portion facing to the magnetic member in a head retracting position or its proximity position.

16. The disk drive unit as defined in claim 15, wherein the magnetic member has any one of shape of a small cylinder, small ellipsoid, and small ball.

17. The disk drive unit as defined in claim 13 or claim 14, wherein the magnetic member has any one of shape of a small cylinder, small ellipsoid, and small ball.

18. The disk drive unit as defined in claim 12, wherein a ramp serving as a head retracting mechanism is disposed at a predetermined position at outside of an outer circumference or inside of an inner circumference of the recording medium.

19. The disk drive unit as defined in claim 18, wherein the ramp is made of materials with a smooth texture having a low friction-coefficient.

20. The disk drive unit as defined in claim 12, wherein the support arm has a gimbal mechanism for holding the slider so as to be movable in a roll-and-pitch direction.

21. The disk drive unit as defined in claim 12, wherein the support arm is made of materials with stiffness.

22. The disk drive unit as defined in claim 12, wherein a plate spring as the resilient means is disposed between the bearing unit and the support arm in an axial direction of rotation.

23. The disk drive unit as defined in claim 12, wherein a pivot bearing having a pair of pivots is disposed on the bearing unit so that the pivots make contact with the support arm, whereby the support arm can move, with help of the pair of pivots as supporting points, in a direction vertical to the surface of the recording medium.

24. The disk drive unit as defined in claim 23, wherein each pivot of the pivot bearing is located so as to be vertical to an axial direction of the pivot bearing and to a lengthwise direction of the support arm, and so as to have contact with the support arm on a line through a center of rotation in a direction along the radius of the recording medium.

25. The disk drive unit as defined in claim 23 or claim 24, wherein each pivot of the pivot bearing is symmetrically located about a lengthwise center line of the support arm.

26. The disk drive unit as defined in claim 25, wherein each pivot of the pivot bearing and the support arm have a point-contact, or a line-contact in which the line is parallel to a surface of the support arm and is vertical to the support arm in its lengthwise direction.

27. The disk drive unit as defined in claim 23 or claim 24, wherein each pivot of the pivot bearing and the support arm have a point-contact, or a line-contact in which the line is parallel to a surface of the support arm and is vertical to the support arm in its lengthwise direction.

28. The disk drive unit as defined in claim 12, wherein a head actuator of the disk drive unit is arranged about a center of rotation of the support arm, containing the bearing unit; the pivot bearing; the resilient means; the support arm; the coil holder having the coil; and a ring-shaped collar disposed under the coil holder.

29. The disk drive unit as defined in claim 12, wherein a center of gravity of a portion held by the resilient means is located at a point of intersection of i) a rotation axis in a direction along the radius of the recording medium; and ii) a rotation axis in direction vertical to the surface of the recording medium.

* * * * *